US009353227B2

(12) United States Patent
Bauch et al.

(10) Patent No.: US 9,353,227 B2
(45) Date of Patent: *May 31, 2016

(54) METHOD AND DEVICE FOR PRODUCING SHORT-CHAIN HALOGENATED POLYSILANES

(75) Inventors: Christian Bauch, Muldenstein (DE); Sven Holl, Gueckingen (DE); Rumen Deltschew, Leipzig (DE); Javad Mohsseni, Bitterfeld-Wolfen (DE); Gerd Lippold, Leipzig (DE); René Towara, Schlaitz (DE)

(73) Assignee: Spawnt Private S.à.r.l., Luxembourg (LU)

( * ) Notice: Subject to any disclaimer, the term of this patent is extended or adjusted under 35 U.S.C. 154(b) by 364 days.

This patent is subject to a terminal disclaimer.

(21) Appl. No.: 13/512,905

(22) PCT Filed: Dec. 2, 2010

(86) PCT No.: PCT/EP2010/068733
§ 371 (c)(1),
(2), (4) Date: Aug. 9, 2012

(87) PCT Pub. No.: WO2011/067333
PCT Pub. Date: Jun. 9, 2011

(65) Prior Publication Data
US 2012/0308464 A1    Dec. 6, 2012

(30) Foreign Application Priority Data
Dec. 2, 2009   (DE) .......................... 10 2009 056 437

(51) Int. Cl.
| C01B 33/12 | (2006.01) |
| C01B 33/08 | (2006.01) |
| C01B 33/00 | (2006.01) |
| C08G 77/60 | (2006.01) |

(52) U.S. Cl.
CPC ..................................... *C08G 77/60* (2013.01)

(58) Field of Classification Search
USPC .......................................... 423/342, 324, 341
See application file for complete search history.

(56) References Cited

U.S. PATENT DOCUMENTS

| 2,981,605 A | 4/1961 | Rummel | |
| 3,042,494 A * | 7/1962 | Gutsche | C01B 33/035 117/102 |

(Continued)

FOREIGN PATENT DOCUMENTS

| DE | 1102117 | 3/1961 |
| DE | 3126240 C2 | 5/1982 |

(Continued)

OTHER PUBLICATIONS

Von Peter W. Schenk, et al., "Darstellung und Eigenschaften des Siliciumdichlorids $(SiCl_2)x_1$," Zeitschrift für anorganische und allgemeine Chemie, Band 334, 1964, pp. 57-65 (English Summary).

(Continued)

*Primary Examiner* — James McDonough
(74) *Attorney, Agent, or Firm* — DLA Piper LLP (US)

(57) ABSTRACT

A method and a device produce short-chain halogenated polysilanes and/or short-chain halogenated polysilanes and halide-containing silicon by thermolytic decomposition of long-chain halogenated polysilanes. The thermolytic decomposition of long-chain halogenated polysilanes diluted with low-molecular halosilanes is carried out under an atmosphere of halosilanes, thereby ensuring the production of such products at industrial scale in a simple and cost-effective manner.

18 Claims, 7 Drawing Sheets

(56) References Cited

U.S. PATENT DOCUMENTS

| | | | | |
|---|---|---|---|---|
| 4,070,444 | A | * | 1/1978 | Ingle .................. C01B 33/08 |
| | | | | 136/258 |
| 4,138,509 | A | * | 2/1979 | Ingle .................. C01B 33/02 |
| | | | | 117/99 |
| 4,292,342 | A | * | 9/1981 | Sarma ................ C23C 14/225 |
| | | | | 136/258 |
| 4,374,182 | A | * | 2/1983 | Gaul .................. C01B 33/107 |
| | | | | 423/341 |
| 6,451,277 | B1 | * | 9/2002 | Lord .................. C01B 33/035 |
| | | | | 423/342 |
| 2004/0250764 | A1 | | 12/2004 | Nagano et al. |
| 2007/0078252 | A1 | * | 4/2007 | Dioumaev ............ C08G 77/60 |
| | | | | 528/31 |
| 2009/0169457 | A1 | * | 7/2009 | Auner .................. C01B 33/027 |
| | | | | 423/342 |
| 2012/0313037 | A1 | * | 12/2012 | Auner .................. C01B 33/107 |
| | | | | 252/182.32 |

FOREIGN PATENT DOCUMENTS

| | | |
|---|---|---|
| DE | 10 2005 024 041 A1 | 11/2006 |
| DE | 10 2006 034 061 A1 | 1/2008 |
| EP | 0 140 660 | 10/1984 |
| EP | 0 264 722 | 10/1987 |
| EP | 0 282 037 | 3/1988 |
| EP | 0 283 905 | 3/1988 |
| GB | 702349 | 1/1954 |
| GB | 838378 | 6/1960 |
| JP | 59-207830 | 11/1984 |
| JP | 63-222011 | 9/1988 |
| JP | 1-192716 | 8/1989 |
| JP | 1-197309 | 8/1989 |
| JP | 7-89708 | 4/1995 |
| JP | 2008-143774 | 6/2008 |
| JP | 2009-227577 | 10/2009 |
| JP | 2011-26155 | 2/2011 |
| WO | 81/03168 | 11/1981 |
| WO | 02/40400 | 5/2002 |
| WO | 2006/125425 A1 | 11/2006 |
| WO | 2009/143823 A2 | 12/2009 |

OTHER PUBLICATIONS

Von Martin Schmeisser, et al., "Über das Siliciumdichlorid $[SiCl_2l_x{}^1)$," Zeitschrift für anorganische und allgemeine Chemie, Band 334, 1964, pp. 50-56 (English Summary).

Oscar H. Giraldo, et al., "Synthesis and Characterization of Halogenated Amorphous Silicon via a Novel Glow Discharge Process," Chem. Mater., vol. 10, No. 1, 1998, pp. 366-371.

L. M. al-Shamma, et al., "The Production and Separation of Hydrogen and Sulfur from Thermal Decompositionof Hydrogen Sulfide Over Vanadium Oxide/Sulfide Catalysts," Int. j. Hydrogen Energy, vol. 15, No. 1, 1990, pp. 1-5.

Dr. Robert Schwarz, "Neuartige Verbindungen des Siliciums*)," Angewandie Chemie 51, Jakrg, 1938, Nr. 23, pp. 328-331.

E. Hengge, et al., "Darstellungund Charakterisierung von α,ω-Dihydroperchlorooligosilanen,"Z. anorg. Allg. Chem. 508, 1984, pp. 33-42.

E. Hengge, et al., "Zur Reaktion Der Silicium-Phenyl-Bindung MIT HCl," Journal of Organometallic Chemistry, 125, 1977, pp. C29-C32.

Von Robert Schwarz, et al., "Einige neue Halogenide des Siliziums. IV.$^1$) Über ein Siliziumchlorid der Formel SiCl," Zeitschrift für anorganische und allgemeine Chemie, Band 241, 1939, pp. 395-415.

Von Robert Schwarz, et al., "Über ein Siliziumchlorid der Formel $Si_{10}Cl_{22}$," Zeitschrift für anorganische und allgemeine Chemie, Band 232, 1937, pp. 241-248.

Von M. Schmeisser, et al., "Das Silicium-dibromid $[SiBr_2]_x$, und seine Derivate," Z. Naturforschg, 11 b, 1956, pp. 278-282.

Von Robert Schwarz, et al., "Über ringförming gebaute Siliciumchloride$^2$)," Zeitschrift für anorganische und allgemeine Chemie, Band 270, 1952, pp. 2-15.

Taiwanese Examination Report dated May 5, 2014 from corresponding Taiwanese Patent Application No. 099141844.

* cited by examiner

METHOD AND DEVICE FOR PRODUCING SHORT-CHAIN HALOGENATED POLYSILANES

RELATED APPLICATIONS

This is a §371 of International Application No. PCT/EP2010/068733, with an international filing date of Dec. 2, 2010 (WO 2011/067333, published Jun. 9, 2011), which is based on German Patent Application No. 10 2009 056 437.3, filed Dec. 2, 2009, the subject matter of which is incorporated by reference.

TECHNICAL FIELD

This disclosure relates to a method for producing short-chain halogenated polysilanes and/or short-chain halogenated polysilanes and silicon by thermolytic decomposition of long-chain halogenated polysilanes.

BACKGROUND

The short-chain halogenated polysilanes in question are often also referred to as halogenated oligosilanes or oligohalosilanes and are compounds which each have at least one direct Si—Si bond and the substituents of which comprise halogen and hydrogen, but preferably consist exclusively of halogen or of halogen and hydrogen.

Long-chain polysilanes have longer chains than the short-chain polysilanes defined above, but otherwise have the same structure. More particularly, long-chain polysilanes are also composed of directly interconnected silicon atoms, the free valencies of which are saturated by chlorine atoms.

Various methods of decomposing halogenated silanes are known. They are predominantly used to produce elemental silicon. DE 1102117 B or U.S. Pat. No. 3,042,494 A, for instance, disclose thermal decomposition of gaseous silicon compounds at heated silicon rods or silicon wires to deposit silicon. Temperatures of 800-1300° C. and $HSiCl_3$ or $SiCl_4$ in a mixture with hydrogen are frequently employed. EP 0282037 A2 describes thermal decomposition of gaseous chlorinated polysilanes $Si_nCl_{2n+2}$ (n=2-4) on silicon and at least 700° C. to deposit polycrystalline silicon. GB 838378, for example, discloses formation of elemental silicon powder by applying an electric discharge to gaseous mixtures of hydrogen and halogenated monosilanes. EP 0264722 A2 describes thermal decomposition of polysilanes $Si_nCl_{2n+2}$ (n≥2) at 250-700° C. to produce amorphous silicon. U.S. Pat. No. 4,292,342, for example, describes deposition of silicon on a preheated substrate after a silicon compound has been reduced with hydrogen in a plasma flame. US 2004/0250764 A1 discloses deposition of silicon from the reaction of $SiF_4$ with hydrogen in a plasma zone onto silicon particles which descend through the plasma zone in a rotating cylinder. U.S. Pat. No. 6,451,277 B1, WO 02/40400 A1 or JP 01197309 A describe deposition of silicon by thermal reaction of gaseous halogenated silanes with hydrogen onto silicon seed grains in fluidized bed reactors.

Various heating methods are disclosed such as conventional resistance heating, microwave irradiation of reactor contents or preheating the reaction gases and the seed grains outside the reaction zone. Gaseous sources of silicon employed include beside halogenated monosilanes also compounds $Si_nCl_{2n+2}$ (n=2-4). U.S. Pat. Nos. 4,070,444 or 4,138,509, for example, describe that solid $(SiF_2)_x$ obtained from gaseous $SiF_2$, or other perfluorinated polysilanes release elemental silicon on heating.

O. H. Giraldo, W. S. Willis, M. Marquez, S. L. Suib, Y. Hayashi, H. Matsumoto, Chemistry of Materials 10 (1998) 366-371 disclose that deposition of amorphous silicon from the gas phase leads to products containing major amounts of other elements. An electric glow discharge in a $SiCl_4/H_2/He$ gas mixture under atmospheric pressure produces amorphous silicon which in addition to hydrogen still contains about 1% Cl.

U.S. Pat. No. 4,374,182 discloses that perchlorinated polysilanes having a molecular weight greater than that of $Si_2Cl_6$ can be decomposed at temperatures between 500° C. and 1450° C. in an inert atmosphere or in vacuo to form silicon. JP 01192716 A describes reduction of perchlorinated polysilanes $Si_nCl_{2n+2}$ at temperatures of 250-1300° C. to produce amorphous or crystalline silicon.

EP 140660 B1 discloses that polymeric halosilane layers are deposed on substrates from gaseous halogenated disilanes or polysilanes at 250-550° C.

R. Schwarz, Angewandte Chemie 51 (1938) 328, R. Schwarz, U. Gregor, Zeitschrift für anorganische und allgemeine Chemie 241 (1939) 395, R. Schwarz, A. Köster, Zeitschrift für anorganische und allgemeine Chemie 270 (1952) 2, M. Schmeisser, M. Schwarzmann, Zeitschrift für Naturforschung 11 b (1956) 278, M. Schmeisser, P. Voss, Zeitschrift für anorganische und allgemeine Chemie 334 (1964) 50, P. W. Schenk, H. Bloching, Zeitschrift für anorganische und allgemeine Chemie 334 (1964) 57 report that tetrahalosilanes react with elemental silicon at high temperatures to form perhalogenated polysilanes $(SiX_2)_x$. R. Schwarz, H. Meckbach, Zeitschrift für anorganische und allgemeine Chemie 232 (1937) 241, R. Schwarz, Angewandte Chemie 51 (1938) 328, R. Schwarz, U. Gregor, Zeitschrift für anorganische und allgemeine Chemie 241 (1939) 395, R. Schwarz, A. Köster, Zeitschrift für anorganische und allgemeine Chemie 270 (1952) 2 or M. Schmeisser, P. Voss, Zeitschrift für anorganische und allgemeine Chemie 334 (1964) 50 disclose that the thermal treatment of chlorinated polysilanes or else of nonvolatile perchlorinated oligosilanes in a vessel leads to products having compositions $SiCl_x$ (x<2) depending on the temperature and the treatment time.

GB 702,349 discloses that the reaction of silicon alloys with chlorine gas at 190-250° C. leads to a mixture of perchlorinated polysilanes (PCS) being condensed out of the gas stream. The average molar mass of these mixtures is relatively low, since distillation reveals that only 2% of the silanes have n larger than 6.

DE 31 26 240 C2 describes wet-chemical production of PCS from $Si_2Cl_6$ by reaction with a catalyst. The mixtures obtained still contain the catalyst and are therefore washed with organic solvents. The PCS thus obtained are highly branched. Further wet-chemical methods are presented, for example, in E. Hengge, D. Kovar, Journal of organometallic Chemistry 125 (1977) C29 or in US 2007/0078252 A1:

reduce halogenated aryloligosilanes with sodium or lithium and then use $HCl/AlCl_3$ to detach aromatics;
  transition metal catalyzed dehydrogenative polymerization of arylated H-silanes and subsequent dearylation with $HCl/AlCl_3$;
  anionically catalyzed ring opening polymerization (ROP) of $(SiCl_2)_5$ with tetrabutylammonium fluoride (TBAF);
  ROP of $(SiAr_2)_5$ with TBAF or $Ph_3SiK$ and subsequent dearylation with $HCl/AlCl_3$.

By combining dearylation, ring opening and hydrogenation of halosilanes in a suitable manner it is possible to obtain partially halogenated short-chain polysilanes as described, for example, in E. Hengge, G. Miklau, Zeitschrift für anorganische and allgemeine Chemie 508 (1984) 33.

In addition to thermal decomposition, it is the reaction between $Cl_2$ and silicon, yielding mainly $SiCl_4$, which is also used for producing chlorinated polysilanes. To enhance the yield of perchlorinated polysilanes, the reaction temperature has to be lowered. EP 283905 produces mixtures of $Si_2Cl_6$ and $Si_3Cl_8$ with $SiCl_4$ by copper-catalyzed reaction of Si at 140-300° C. The yield of polysilanes reaches more than 40% based on the amount of Si used. $SiCl_4$ is present in the product mixture at less than 50% by weight only.

It is further known to produce halogenated polysilanes of this type via a plasma-chemical method. DE 10 2005 024 041 A1 relates to a method for producing silicon from halosilanes which comprises a first step of converting the halosilane to a halogenated polysilane by producing a plasma discharge and a subsequent, second step of decomposing the halogenated polysilane to silicon by heating to more than 500° C. The polysilane is obtained in the form of a waxily white to yellow-brown or brown solid material of little compactness.

WO 81/03168 further describes a high-pressure plasma process for synthesis of $HSiCl_3$ while PCS are obtained as minor by-products. Since these PCS are generated at extremely high gas temperatures, they are relatively short-chained and highly branched. In addition, this PCS has a high hydrogen content due to the hydrogenative conditions ($HSiCl_3$ synthesis). DE 10 2006 034 061 A1 additionally describes a similar reaction in which gaseous and liquid PCS are obtained with $Si_2Cl_6$ as a main component (page 3, [00161]).

The predominant proportion of prior art methods of decomposing halogenated silanes produce elemental silicon. The degree of decomposition of the halogenated silanes used and, hence, the composition of products is oftentimes very difficult to control. The residual concentrations of halogen and hydrogen are low. Solid materials having comparatively low silicon contents are exclusively by-produced. The likewise predominant proportion of prior art methods rely on gaseous halogenated silanes being fed into the decomposition process and therefore cannot be used for decomposing high-boiling compounds. Monosilanes are predominantly used as starting compounds, the decomposition of which can make it necessary to feed a further reaction gas such as hydrogen.

The known methods are generally also costly and inconvenient in that short-chain halogenated polysilanes are only formed as by-products and therefore are not obtainable in this way on an industrial scale.

It could therefore be helpful to provide a method for producing short-chain halo-genated polysilanes and/or short-chain halogenated polysilanes and silicon, the method enabling the production of such products in a simple and inexpensive manner on an industrial scale.

SUMMARY

We provide a method for producing short-chain halogenated polysilanes and/or short-chain halogenated polysilanes and halide-containing silicon including thermolyticly decomposing long-chain halogenated polysilanes, wherein the thermolytic decomposition of long-chain halogenated polysilanes undiluted or diluted with low-molecular halosilanes is in a halosilane atmosphere.

We also provide an apparatus for thermolytic decomposition of long-chain halogenated polysilanes to obtain short-chain halogenated polysilanes, including a reactor housing having a longitudinal axis, a feeder in one end region of the reactor region that feeds the starting materials, a conveyor in the reactor housing interior that conveys the starting materials in the longitudinal direction of the reactor housing, a heater that supplies the housing interior with the thermal energy needed for the thermolytic decomposition, and a withdrawing device in the other end region of the reactor housing that withdraws the thermolytically decomposed end products.

DETAILED DESCRIPTION

We provide a method which effects thermolytic decomposition of long-chain halogenated polysilanes diluted with low-molecular halosilanes or undiluted long-chain halogenated polysilanes in a halosilane atmosphere.

This produces short-chain halogenated polysilanes. Such a production also possibly generates silicon in elemental form, the production of which is, however, not a main goal. These short-chain halogenated polysilanes as defined at the outset can only be obtained with difficulty by prior art methods, if at all. Yet the short-chain halogenated polysilanes are important starting materials for silicon production and the synthesis of corresponding derivatives.

Our method provides the short-chain halogenated polysilanes in good yield.

Long-chain halogenated polysilanes of Formula $SiX_mH_o$ (X=F, Cl, Br, I; 0<m<2.7; 0≤o<2.7) are decomposed by thermolysis. The thermolysis is carried out in a suitable temperature range, more particularly at temperatures above 200° C. and below the melting point of elemental silicon, especially at temperatures of 300° C. to 1000° C. and preferably 400° C. to 950° C. The long-chain halogenated polysilanes subjected to thermolysis are diluted with low-molecular halosilanes, while the low-molecular halosilanes used for dilution are preferably halogenated polysilanes, more particularly short-chain halogenated polysilanes, for example, of Formula $Si_nX_{2n+2}$ where n=1-4. More particularly, liquid halogenated silanes of Formulae $HSiX_3$, $SiX_4$ or $Si_2X_6$ can also be used.

The long-chain halogenated polysilanes $Si_nH_oX^1_p$ ($X^1$=F, Cl, Br, I; o=0 to 2n+1; p=1 to 2n+2 where (o+p)≤2n+2) are preferably diluted with low-molecular short-chain halogenated polysilanes $Si_nX^2_{2n+2}$ where n=1-4 whose halogen substituents are the same as in the long-chain halogenated polysilanes, i.e., $X^1$=$X^2$. When undiluted long-chain halogenated polysilanes are used, it is likewise preferable to use a halosilane atmosphere in which the halosilanes have the same substituents as the long-chain halogenated polysilanes.

The low-molecular halosilanes used for dilution may be liquid halogenated silanes of low viscosity, for example, $HSiCl_3$, $SiCl_4$ or $Si_2Cl_6$. Here is preferable to use very low-molecular halosilanes.

The thermolysis method is conducted in a halosilane atmosphere. The halosilane atmosphere may be produced by the low-molecular short-chain halogenated polysilanes used to dilute the long-chain halogenated polysilanes being converted into the gas phase. Conversion into the gas phase preferably takes place during thermolytic decomposition of the long-chain halogenated polysilanes.

Alternatively or additionally, the long-chain halogenated polysilanes for thermolytic decomposition can be introduced into a reactor which already contains a halosilane atmosphere. This can be the case, for example, when using undiluted long-chain halogenated polysilanes. When the method is carried out continuously, the volatile decomposition products of long-chain halogenated polysilane already decomposed thermolytically can likewise contribute to the halosilane atmosphere for the thermolytic decomposition of further long-chain halogenated polysilanes.

The method is preferably used to produce short-chain chlorinated polysilanes (perchlorinated polysilanes PCS), for which long-chain chlorinated polysilanes are subjected to thermolytic decomposition. The method is preferably carried out in a chlorosilane atmosphere, wherein the long-chain chlorinated polysilanes are diluted with low-molecular chlorosilanes, especially with $SiCl_4$ or other chlorosilanes.

The long-chain halogenated polysilane which is the starting material to be decomposed thermolytically using the method can be used in solid or liquid form and in either case is diluted. An additional reduction in viscosity by preheating is likewise possible.

The method is advantageously conducted at an underpressure of 10 mbar-500 mbar, preferably 10 hPa to 300 hPa.

A protective gas stream is generally not required to carry out the method. However, this does not rule out the possibility that such a protective gas stream may be used. Hydrogen can be added as a reducing gas.

The method is preferably conducted continuously.

In particular, thermally or plasma-chemically produced long-chain halogenated polysilanes are decomposed. More particularly, the long-chain halogenated polysilanes can be halogenated polysilanes as pure compound or mixture of compounds which each have at least one direct Si—Si bond and the substituents of which consist of halogen or of halogen and hydrogen and in the composition of which the atomic ratio for substituent:silicon is at least 1:1, characterized in that
a. the halogen is selected from: chlorine, bromine, fluorine and iodine and also combinations thereof,
b. its significant product signals in $^{29}$Si NMR spectra are in the chemical shift range of +15 ppm to −7 ppm when the halogen is chlorine; its significant product signals in $^{29}$Si NMR spectra are in the chemical shift range of −10 ppm to −42 ppm, −48 ppm to −52 ppm and/or −65 ppm to −96 ppm when the halogen is bromine; its significant product signals in $^{29}$Si NMR spectra are in the chemical shift range of 8 ppm to −30 ppm and/or −45 ppm to −115 ppm when the halogen is fluorine; and its significant product signals in $^{29}$Si NMR spectra are in the chemical shift range of −20 ppm to −55 ppm, −65 ppm to −105 ppm and/or −135 ppm to −81 ppm when the halogen is iodine.

Halogenated polysilanes may be used, wherein the halogen is chlorine in which case the halogenated polysilanes additionally
have a Raman molecular vibration spectrum of $I_{100}/I_{132}$ larger than 1, where $I_{100}$ is the Raman intensity at 100 $cm^{-1}$ and $I_{132}$ is the Raman intensity at 132 $cm^{-1}$, and wherein
the hydrogen content of the polysilanes is less than 2 atomic %, and
the polysilane contains almost no short-chain branched chains and rings, wherein the amount of branching points in the short-chain fraction, more particularly in the summed fraction of perhalogenated derivatives of neohexasilane, neopentasilane, isotetrasilane, isopentasilane, perchloro-2,3-disilyltetrasilane and isohexasilane, is less than 1 mol % based on the entire product mixture.

The amount of branching points herein is determined by integrating the $^{29}$Si NMR signals for the tertiary and quaternary silicon atoms. Short-chain fraction of halogenated polysilanes is to be understood as referring to any silane having up to 6 silicon atoms. Alternatively, the amount of perhalogenated short-chain silanes is particularly quick to determine using the following procedure, as exemplified with perchlorinated compounds: First the range from +23 ppm to −13 ppm in the $^{29}$Si NMR is integrated (signals from primary and secondary silicon atoms appear therein in particular) and subsequently the signals for tertiary and quaternary silicon atoms in the range of −18 ppm to −33 ppm and −73 ppm to −93 ppm of the respective perchlorinated derivatives of the following compounds: neohexasilane, neopentasilane, isotetrasilane, isopentasilane, perchloro-2,3-disilyltetrasilane and isohexasilane. Thereafter, the ratio of the respective integrations $I_{short-chain}:I_{primary/secondary}$ is determined. This is in respect of the summed integration for the respective perchlorinated derivatives of neohexasilane, neopentasilane, isotetrasilane, isopentasilane and isohexasilane less than 1:100.

In the case of long-chain halogenated polysilanes where the substituents are bromine or iodine or fluorine, but not chlorine, the significant product signals of $^{29}$Si NMR spectra appear in other chemical shift ranges, for example, in the chemical shift range of −10 ppm to −42 ppm, −48 ppm to −52 ppm and/or −65 ppm to −96 ppm when the substituents are bromine, in the chemical shift range of −20 ppm to −55 ppm, −65 ppm to −105 ppm and/or −135 ppm to −181 ppm when the substituents are iodine, or significant product signals in $^{29}$Si NMR spectra appear in the chemical shift range of 8 ppm to −30 ppm and/or −45 ppm to −115 ppm when the substituents are fluorine.

The synthesis and characterization of these long-chain halogenated polysilanes is described in WO 2009/143823 A2, the subject matter of which is incorporated herein by reference.

Further long-chain halogenated polysilanes which can be used in the method are described, for example, in WO 2006/125425 A1, the subject matter of which is incorporated herein by reference.

The end product obtained using the method are short-chain halogenated polysilanes obtained in the form of a mixture of different components in varying composition. The method optionally also provides halide-containing silicon.

The short-chain low-molecular halosilanes used for dilution are preferably those of Formula $Si_nX_{2n+2}$ where n=1-4. When short-chain chlorinated polysilanes are to be produced, low-molecular chlorosilanes in particular are used for dilution.

Preferably, the thermolytic decomposition is effected in an undiluted halosilane atmosphere. It is further preferable when the thermolytic decomposition is effected in a halosilane stream of diluents and reaction products (until the reaction products are condensed out).

Particularly preferably, the low-molecular halosilanes used for dilution serve as a source of the halosilane atmosphere. The heating which takes place causes the liquid low-molecular halosilanes to become converted into the gaseous halosilane atmosphere.

The method therefore involves long-chain halogenated polysilanes being diluted with low-molecular halosilanes in a specific manner, wherein the diluent is preferably used as a source of the desired halosilane atmosphere. Conversion into the halosilane atmosphere can be assisted with underpressure.

The method provides either short-chain halogenated polysilanes and/or short-chain halogenated polysilanes in combination with halide-containing silicon. The halide-containing silicon obtained has more particularly the empirical or analytical Formula $SiX_n$ (X=halogen, n=0.01 to 0.8). To determine the empirical Formula, for example, a chloride determination can be carried out as described by Mohr, for example, in which case the Si can then be determined by differential weighing.

Some of the chloride-containing silicon, especially more than 0.1% by weight of the total amount, may disperse in dust form in the gas phase.

The thermolytic decomposition of long-chain halogenated polysilanes may be accompanied by a disproportionation, that is, long-chain halogenated polysilanes having a medium positive oxidation number are decomposed into shorter-chained halogenated polysilanes having a higher positive oxidation number and into longer-chained polysilanes having a lower positive oxidation number. More particularly, the halide-containing silicon which can likewise be formed during the thermolytic decomposition can be regarded as high molecular weight decomposition product of long-chain halogenated polysilanes. The halide-containing silicon has a lower oxidation number compared to the long-chain halogenated polysilanes.

Some of the dust-form chloride-containing silicon can be washed back into the reactor by the condensing and/or refluxing short-chain chlorinated polysilanes which can afford higher yields.

In the following, our methods will be more particularly elucidated using operative examples.

OPERATIVE EXAMPLE 1

In a continuous thermolysis, the temperature was adjusted to 450° C. in a suitable reaction vessel, and the reaction vessel was evacuated down to 250 mbar. A polychlorosilane mixture having the empirical Formulae $Si_nCl_{2n+2}$ and $Si_nCl_{2n}$ (Øn=18) was added dropwise, in the form of an 80% by weight solution in $SiCl_4$, as low-molecular diluent, upstream of the thermolysis zone at a local temperature of 120° C., whereupon inter alia a halogen atmosphere is formed by vaporizing the $SiCl_4$. The polychlorosilane mixture was advanced through the hot zone of the apparatus (450° C.), while the vaporized thermolysis products contribute to the chlorosilane atmosphere. Thereby, the polychlorosilane mixture converted into a solid, highly crosslinked perchlorinated polysilane (chloride-containing silicon) of the empirical formula $SiCl_{0.7}$ and short-chain chlorosilanes. The $SiCl_{0.7}$ was collected in a collecting vessel. The diluent $SiCl_4$ and short-chain chlorosilanes formed by the thermolysis ($SiCl_4$, $Si_2Cl_6$, $Si_3Cl_8$) were drawn off as vapor and condensed.

Yields: 20% by weight of $SiCl_{0.7}$ and 80% by weight of short-chain chlorosilanes (diluent quantity not included).

OPERATIVE EXAMPLE 2

A 50-60% solution of a polychlorosilane mixture having an average empirical Formula of $Si_nCl_{2n}$ (Øn=18) in $SiCl_4$ as low-molecular diluent is initially charged to a glass container and heated for 2 to 3 h to 300° C. at a pressure of 300 to 500 mbar. Thereafter, the pressure is reduced in stages to finally 10 mbar and heating to 900° C. is effected in the course of 3 h. Lastly, the temperature is maintained at 900° C. for 1 h. The vapors formed during the thermal decomposition of the polychlorosilane mixture are condensed out in a cold trap cooled with liquid nitrogen. The polychlorosilane mixture converted into a solid, highly crosslinked chlorineated polysilane (chloride-containing silicon) of the empirical Formula $SiCl_{0.05}$ to $SiCl_{0.07}$ and short-chain chlorosilanes of Formula $Si_nCl_{2n+2}$ where n=1 to 8 as mixture of isomers. After the reaction had ended, the container was allowed to cool down and the solid product was removed.

Yields based on the starting material: 10-15% by weight of $SiCl_{0.05}$ to $SiCl_{0.07}$ and 85-90% by weight of short-chain chlorosilanes (diluent quantity not included).

OPERATIVE EXAMPLE 3

Figure 7:
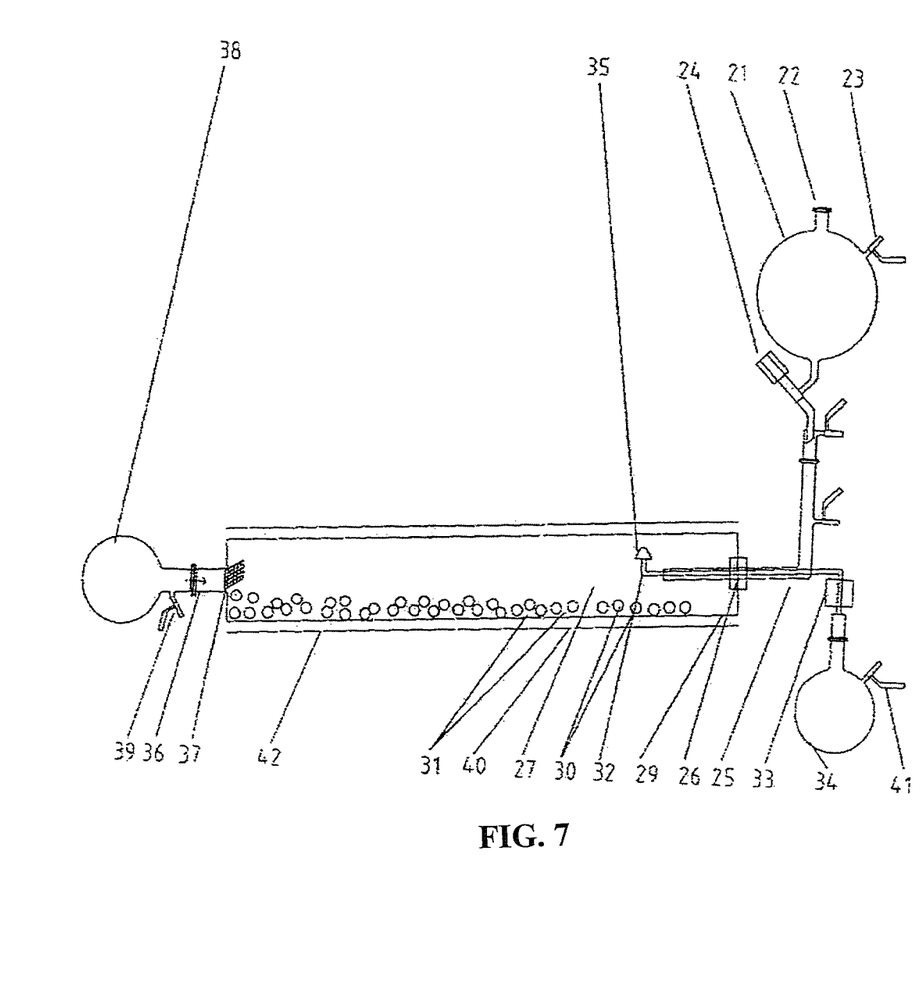
FIG. 7 shows a schematic longitudinal section through a further embodiment of an apparatus for thermolytical decomposition.

Stock reservoir vessel 21 for long-chain halogenated polysilanes is subsequently charged with 2966 g of $SiCl_4$ solution, containing altogether 2200 g of polychloropolysilane via the refill nozzle 22 and under protective gas counter flow (protective gas valve 23). The starting material is metered via the discharge valve 24 into the feed line 25, from where it flows via the coupling connector 26 into the first heating zone 27 of the rotatable thermolysis tube 29, where volatiles vaporize with immediate foaming. The thermolysis tube 29 rotates about its longitudinal axis at 15 rotations per minute, which causes the ultrapure silicon grinding balls present to smash the foam-like product which initially forms. The first heating zone 27 has been set to a temperature of 600° C., as a result of which a brown, gritty to dusty product forms on and between the grinding balls. The resulting vapors of the diluent and of the decomposition products ($SiCl_4$ and OCS) escape via the vapor output 32, whereupon grayish brown dust is dragged out. A weak vacuum (300-500 mbar) is applied via the valve 41 to force the vapors virtually completely through the vapor outlet 32 into the intensive condenser 33, where they condense together with the majority of the dust and flow into the flask 34. This gives 2180 g of a grayish brown suspension which in addition to $SiCl_4$ contains minor quantities of short-chain chlorinated oligosilanes of Formula $Si_nCl_{2n+2}$ where n=2 to 5 as isomeric mixtures and small quantities of silicon dust (about 5 g), which in the large part settles out overnight. The brown powdery solid is conveyed through the second heating zone 42, which is heated to 900° C., by virtue of the rotatory motion of the pyrolysis tube and to the discharge opening 36 where it flows through the sieve 37 into the flask 38. This gives 316 g of a blackish gray solid. This solid exhibits the x-ray diffraction intensities of silicon and has a chloride content of 4.6%.

In all three Operative Examples, the short-chain halogenated polysilanes were spectroscopically identified by $^{29}Si$ NMR after fractionation of the product mixtures, wherein polysilanes having a chain length n>6 were structurally not completely characterized. These compounds, however, are detectable in the NMR spectrum by characteristic signals in the region of the neo compounds, for example.

We further provide apparatus for thermolytic decomposition of long-chain halogenated polysilanes to obtain short-chain halogenated polysilanes.

Such thermolytic decomposition reactions are known. We provide apparatus suitable for performing such a thermolytic decomposition in a continuous manner on an industrial scale.

The apparatus comprises the following constituents:
a reactor housing having a longitudinal axis;
feeding means in one end region of the reactor housing for feeding the starting materials (long-chain halogenated polysilanes);
conveying means in the reactor housing interior for conveying the starting materials in the longitudinal direction of the reactor housing;
heating means for supplying the housing interior with the thermal energy needed for the thermolytic decomposition; and
withdrawing means in the other end region of the reactor housing for withdrawing the thermolytically decomposed end products.

The long-chain halogenated polysilanes which constitute the starting materials may be solid and introduced into the reactor housing via the feeding means. With the conveying means in the reactor housing interior, the solid starting materials is conveyed in the longitudinal direction of the reactor housing and thereby subjected to thermal energy so that they decompose to short-chain halogenated polysilanes which are removed from the reactor housing in gas form via the withdrawing means.

The solid long-chain halogenated polysilanes may be diluted and introduced into the reactor housing in the diluted, i.e., liquid, state and thermolytically decomposed in corresponding fashion.

With the conveying means, the starting materials are transported through the heating zone in the reactor housing in a continuous manner so that a continuous process of thermolytic decomposition can be carried out. Continuous operation is thereby achieved for the apparatus. The decomposition temperatures and the residence time of the material in the apparatus determine the degree of decomposition of the halogenated polysilanes and, hence, the composition of the end product obtained.

As mentioned above, the long-chain halogenated polysilanes can also be introduced into the reactor housing in liquid form. In this case, the starting material can itself be liquid under standard conditions, be brought into the liquid state by dissolving in solvents or diluting in diluents, and/or be melted by preheating to temperatures <200° C.

The apparatus therefore preferably additionally includes means for dissolving, diluting and/or preheating the starting materials.

The heating means for supplying the housing interior with the thermal energy needed for the thermolytic decomposition ensure that the temperature range of in particular 300° C. to 1000° C. is maintained in the heating zone of the reactor housing. The required thermal energy can be generated for example through electric voltages or alternating electromagnetic fields.

Electrical resistance heating means are preferred.

The apparatus possesses a reactor which includes the above-mentioned reactor housing. The reactor is configured as a hollow body having preferably rounded lateral inside walling and a defined longitudinal axis, although other cross-sectional shapes are also possible. The interior space corresponds, for example, to a cylinder, a truncated cone, a spherical calotte or an elliptical tube.

The conveying means comprise one or more inner structures mounted in the longitudinal direction of the hollow body. These inner structures can be disposed parallel to the longitudinal axis of the hollow body or, in hollow bodies which are rotationally symmetrical along the longitudinal axis, be coiled helically about the longitudinal axis. Each inner structure may have a flat, angular or round cross section and possess one or more attached blade structures. These wing structures may extend parallel to the longitudinal axis of the corresponding inner structure or be wound helically around the inner structure Inner structures of angular cross section may be helically twisted along their longitudinal axis.

The inner structures and/or the attached wing structures of the conveying means preferably reach close to the reactor housing inside walling. It is particularly preferable for the minimum separation of 0 to 5 mm to be maintained between the structural components under the operating conditions. When the apparatus contains two or more inner structures, these can have different constructions and/or be intermeshed with each or one another. The minimum separation between adjacent inner structures including any blade structures is preferably in the range from 0 to 5 mm under operating conditions.

Preferably, conveying means and reactor housing are arranged to be rotatable relative to each other. The inner structures may rotate relative to the housing inside walling along the longitudinal axis during operation. For example, the housing can stay stationary and the inner structures can rotate parallel to the longitudinal axis of the hollow body.

Mutually intermeshed inner structures must have contrary directions of rotation. Alternatively, the housing can also rotate about static inner structures of conveying means, or both the structural components can move in the opposite direction of rotation or co-rotate at different speeds. The corresponding relative movement between housing inside wall and the inner structures of conveying means and/or between adjacent inner structures serves to detach the material at least partly from its supporting surface.

The conveying means are configured such that material is transported in the direction of the longitudinal axis as a result of the rotary motion.

The longitudinal axis of the reactor is preferably horizontal or inclines downwardly from one end region (with the feeding means) of the reactor housing to the other end region thereof (with the withdrawing means). The angle of inclination can be 0°-90° relative to the horizontal.

Preferably, the reactor housing additionally includes at least one discharging means for gaseous decomposition products and/or at least one feeding means for a protective gas (inert gas) and/or the halosilane atmosphere. The reactor housing may further be equipped with an underpressure application means. Moreover, the reactor housing may have a plurality different thermal treatment zones in the axial direction so that different temperature zones can be maintained in the axial direction of the housing. A plurality of heating zones and cooling zones may be provided, for example, so that defined temperature gradients can be set in the axial direction.

The reactor housing inside wall preferably consists of chemically inert material, more particularly of quartz glass, silicon carbide, silicon nitride, silicon and the like. This ensures that the reactor housing is not affected by the thermolytic decomposition that is carried out.

The conveying means are preferably configured as a screw conveyor or as a shaft equipped with blades.

The reactor housing is preferably heated externally.

The reactor housing may include at least one planar bordering face along which the material moves radially. The movement of material across the bordering face is due to the conveying means wherein the corresponding inner structure makes a rotary movement relative to the bordering face. The axis of rotation of the rotary movement may be perpendicular to the bordering face. Specifically, the inner structure may have a sheetlike configuration relative to the bordering face and/or be equipped with blade structures.

The conveying means (the inner structure and/or the attached blade structures) preferably reach close to the planar final surface. It is particularly preferable to maintain a separation of 0 to 5 mm between the structural components under the operating conditions. The conveying means may convey material by performing a rotational movement, as explained above. However, it may also perform a translational movement to convey material. Such a translational movement can have a rotary movement superimposed on it.

The conveying means in the reactor housing interior may be formed by the reactor housing itself which is provided with appropriate conveying elements, for example, helical structures, blade structures and the like, on the inner surface. This structure accordingly does not require additional conveying means mounted in the housing interior. An appropriate rotary movement of the housing is responsible for material conveyance in the axial direction.

In this case in particular, arbitrarily shaped grinding media can be present in the reactor housing interior to effect or promote a material comminution and/or a detachment of material from the housing inside wall. The grinding media in the process can remain continuously within the reactor or leave the reactor and be replaced by adding further grinding media. These grinding media can be new grinding media as well as grinding media which have already been used.

The reactor housing may be equipped in one end region with an inner tube equipped on its inside with axially extending lines for feeding and/or withdrawing products and/or with measurement lines. The lines in question can be distributed in uniform intervals over the circumference of the inner tube. The ends of the lines can have, for example, radially extending in/outlet openings which extend through the reactor housing wall or, respectively, into the interior of the reactor. The lines can serve, for example, to import starting materials, to export gaseous products, to import a protective gas and as pressure measurement line.

In the following, our devices and methods will be elucidated in detail with reference to an example in connection with the drawings.

Figure 1:
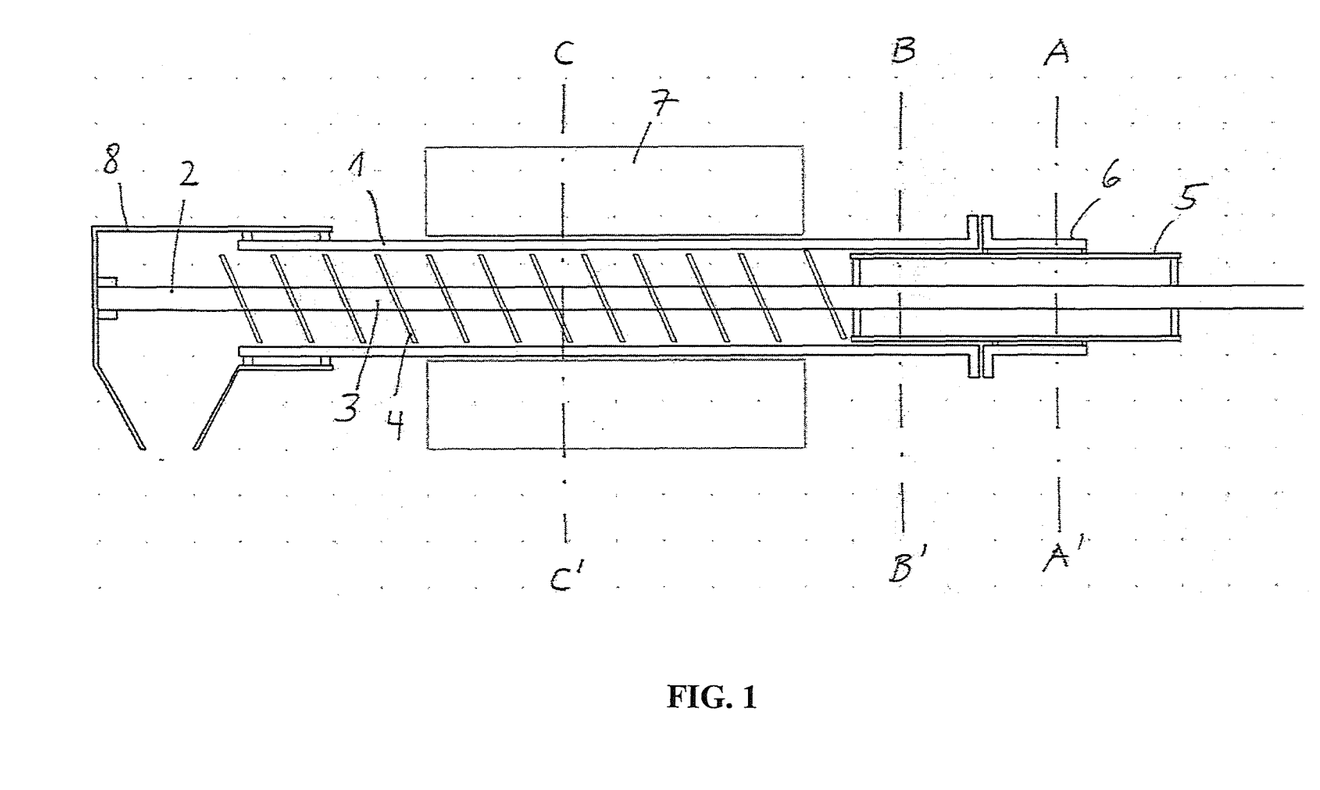
FIG. 1 shows a vertical longitudinal section through an apparatus for thermolytic decomposition of long-chain halogenated polysilanes.

FIG. 1 shows a longitudinal section of a schematically depicted apparatus for thermolytic decomposition of long-chain halogenated polysilanes which possesses a reactor housing 1 configured as a quartz glass tube in this example. The reactor housing 1 is rotatable and has a drive part 6. Reactor housing 1 contains a conveying means 2 which consists of a central shaft 3 and a forward feed coil 4 disposed thereon. Rotation of the shaft 3 transports corresponding material from right to left in the FIG. 1.

At the right-hand side end of reactor housing 1 in FIG. 1 is a fixed inner tube 5 which is equipped on its inside with axially extending lines for feeding and/or withdrawing products and/or with measurement lines. These lines are shown in detail in the sectional depictions which follow. At the left-hand side end of reactor housing 1 in FIG. 1 is a withdrawing means 8 for the thermolytically decomposed end products which has a fixed configuration and includes a funnel which leads in the downward direction. The reactor housing 1 configured as a glass tube, is rotatably mounted within the withdrawing means 8 via suitable seals.

A heating zone 7 in the middle region of the reactor housing, but outside thereof includes a suitable heating means, for example, a resistance heater to supply thermal energy to the atmosphere in the housing.

The apparatus described above is configured as a rotary tubular oven. The polysilane material to be decomposed is introduced via the fixed inner tube 5 into the rotating housing 1 and transported by the conveying means 2 to the left-hand side end of the reactor housing in FIG. 1. Along its way, the material passes through the heating zone and undergoes thermolytic decomposition in the process. The end product leaves the reactor housing via the funnel of means 8. A protective gas, for example, can be introduced axially into the housing 1 via the inner tube 5. Furthermore, resulting gaseous reaction products can be withdrawn via the inner tube 5.

Figure 2:
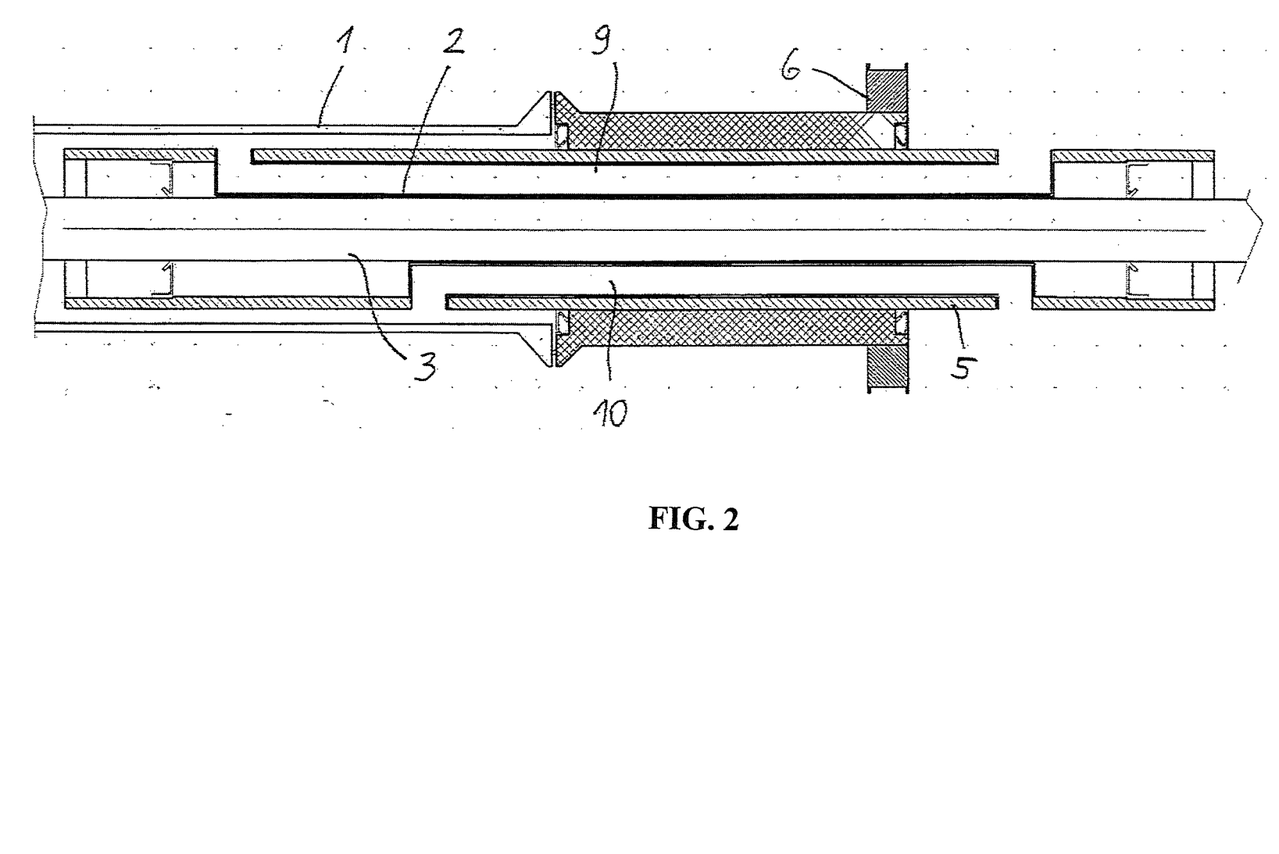
FIG. 2 shows a horizontal section through part of the apparatus of FIG. 1.

FIG. 2 shows the inner tube 5 in enlarged form in horizontal section. It is apparent that the inner tube 5 includes a line 9 for feeding the material to be decomposed thermolytically and a line 10 for feeding a protective gas. These lines have radially extending inlet and outlet openings in the inner tube 5. The shaft 3 of conveying means 2 extends through the fixed inner tube 5.

Figure 3:
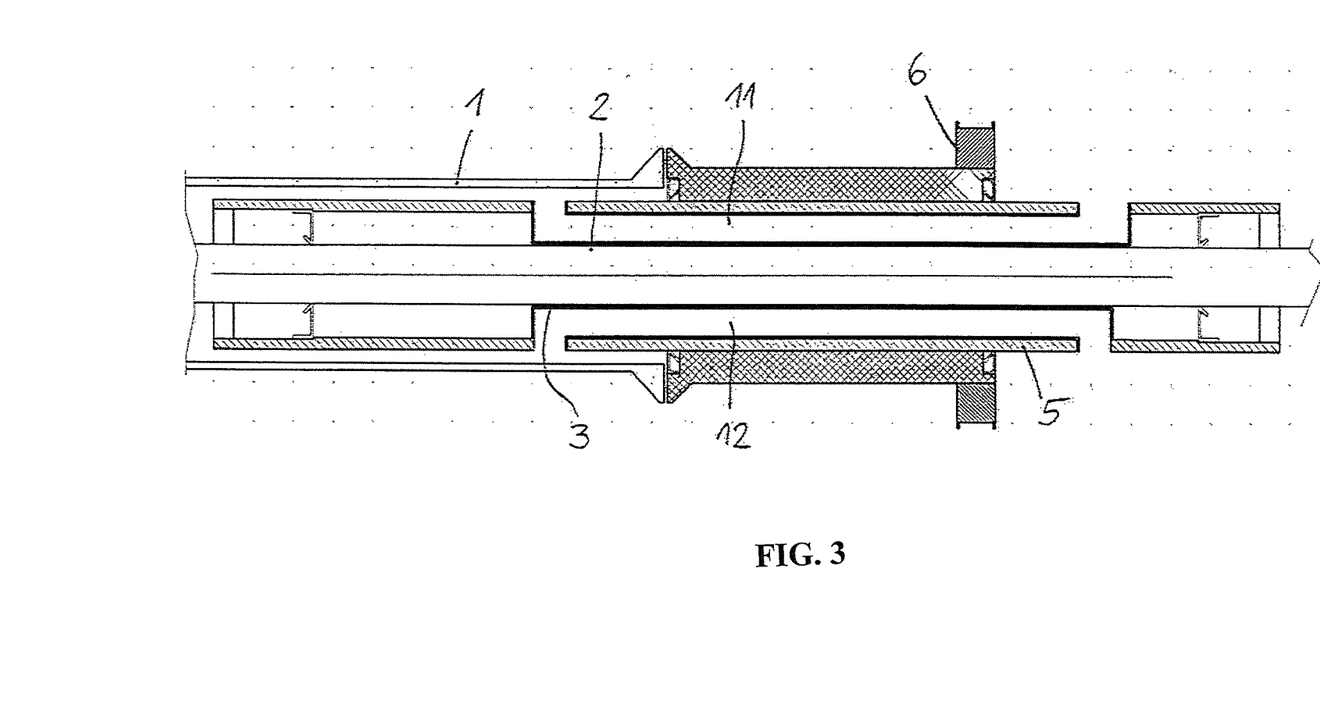
FIG. 3 shows a vertical section through that part of the FIG. 1 apparatus which is shown in FIG. 2.

FIG. 3 shows the inner tube 5 in enlarged form in vertical section. It is apparent that the inner tube 5 further possesses a pressure measurement line 11 and a removal line 12 for gaseous reaction products. These lines also possess radially extending inlet and outlet openings.

Figure 4:
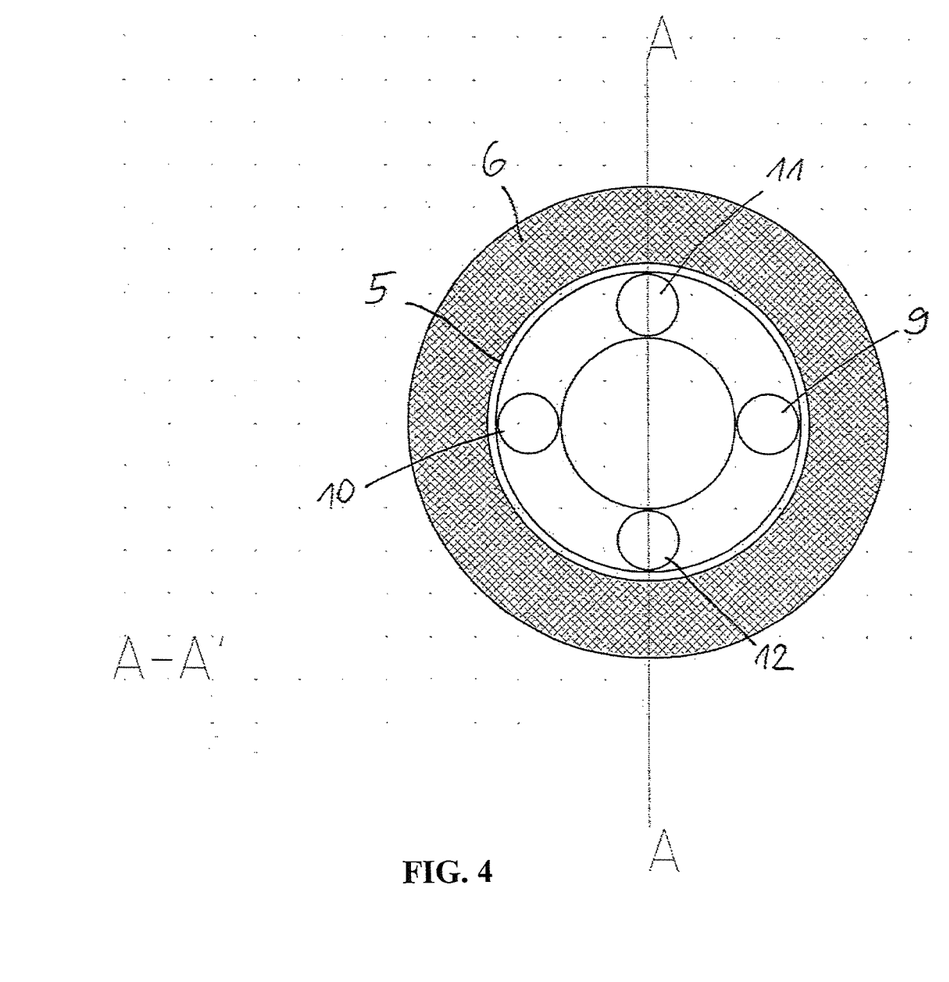
FIG. 4 shows a cross section along the A-A' line in FIG. 1.
Figure 5:
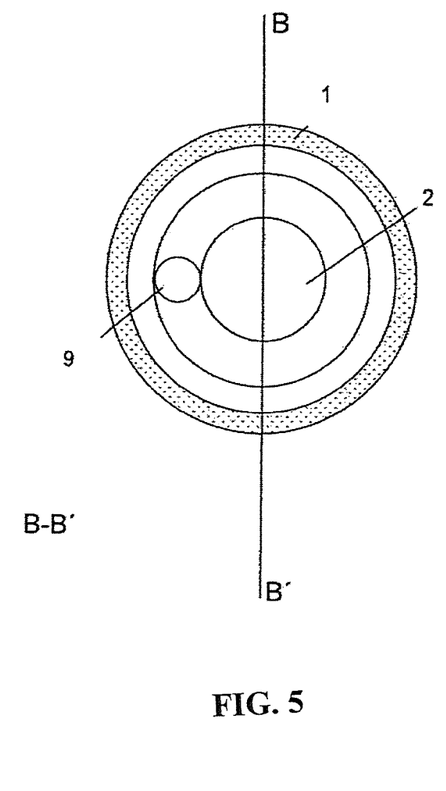
FIG. 5 shows a cross section along the B-B' line in FIG. 1.
Figure 6:
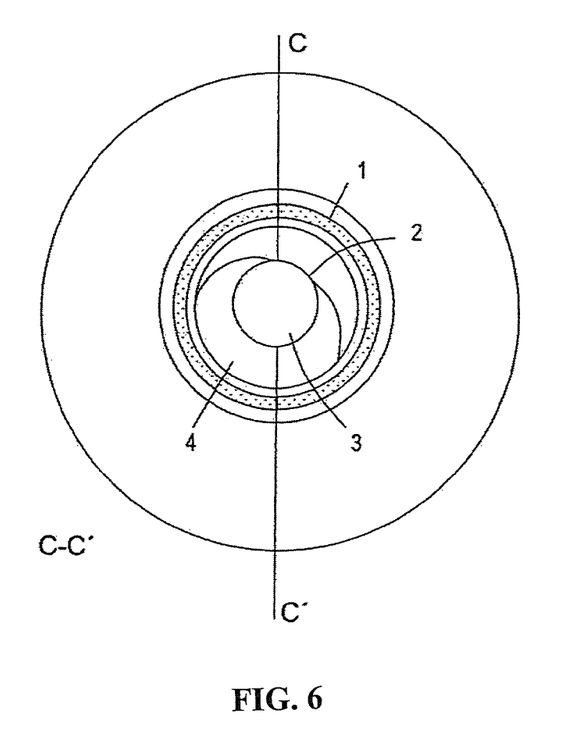
FIG. 6 shows a cross section along the C-C' line in FIG. 1.

The A-A' section of FIG. 4 reveals that the fixed inner tube 5 includes the above-mentioned four lines 9, 10, 11 and 12, which are arranged on the inside of the tube along the circumference thereof. Section B-B' in FIG. 5 shows the feed line 9 for the material to be decomposed. Section C-C' in FIG. 6 shows the conveying means 2 with the central shaft 3 and the helix 4 disposed thereon.

FIG. 7 shows a further example of a thermolytic decomposition apparatus. The apparatus possesses a stock reservoir vessel 21 for long-chain halogenated polysilanes with refill nozzle 22 and protective gas valve 23. The starting material is metered via the discharge valve 24 into a feed line 25 from where it flows via a coupling connector 26 into a first heating zone 27 of the rotatable thermolysis tube 29, which is preferably fabricated from quartz glass and rotates about its longitudinal axis during operation. In one version, starting material is injected such that it arrives in a region 40 of the reactor in which grinding media 30 prevent any ongrowth of solid material. The first heating zone 27 has a temperature setting (350-500° C.) such that the diluent (SiCl$_4$, for example) vaporizes spontaneously so that the material sticks to grinding media 30 which, for example, can be embodied in spherical or bar form and should consist of ultrapure silicon to avoid contamination, and a thermolysis takes place to a brittle, flowable, solid product 31. The temperature in this zone 40 should not be so high (ideally less than 600° C.) as to form crystalline silicon such that the ongrowth of hard layers may be avoided. The vapors of the diluent and of the decomposition products (SiCl$_4$ and OCS) escape via a vapor outlet 32 which preferably has strictly monotonously descending configuration toward the outside such that the condensing vapors may readily escape and flow away, where they pass via a condenser 33 into a collecting device 34 for OCS. The collecting device 34 can be used to augmentatively apply vacuum or at least ensure pressure equalization such that the vapors may be routed out of the oven and pressure build-up may be prevented. To prevent ingress of millbase into the vapor outlet, the latter may bear a protective hood 35. To stop condensed OCS flowing back, the vapor outlet 32 may have a siphonlike configuration.

The solid constituents are conveyed by the rotary movement of the reactor (pyrolysis tube) and the grinding activity of the grinding media 30 in the direction of a removal opening 36, and to augment this conveying direction the reactor is preferably mounted to descend slightly in this direction. A coarse sieve 37 is preferably installed in front of the opening 36 such that any output of grinding media may be prevented. The resulting long-chain chlorinated polysilane or chloride-containing silicon is collected in a flask 38. To prevent any condensation of OCS vapors in flask 38, a slow stream of carrier gas, for example Ar, can be regulated via a valve 39. To save carrier gas, it can also be, for example, circulated using a diaphragm pump from valve 41 in the direction of valve 39.

As the material migrates through the second heating zone 42, it is heated to the desired end temperature so that thermolytic decomposition can take place. Thereby, substances again escape in vapor form.

To achieve an effective grinding performance, the reactor 29 preferably contains internals, for example, in the form of longitudinal grooves which lift the grinding media 30 a bit before these then fall back onto the millbase (ball mill principle).

To ensure rotatability of the reactor (thermolysis tube) 29, the connector 26 (coupling connector) has to contain a rotatable sealing device such that air cannot get into the system. A special embodiment consists in designing both the feed line 25 and the vapor outlet 32 in the form of a flexible tube having multiple coils such that the reactor 29 can turn at least once without departing the elastic range of the tube material. The turning will then always be alternatingly back and forth, while reactant and product can be transported in the interior of the lines. This provides a hermetic seal.

The invention claimed is:

1. A method for producing short-chain halogenated polysilanes and/or short-chain halogenated polysilanes and halide-containing silicon comprising thermolytically decomposing long-chain halogenated polysilanes, wherein the thermolytic decomposition of long-chain halogenated polysilanes undiluted or diluted with low-molecular halosilanes is in a halosilane atmosphere, wherein the long-chain halogenated polysilanes are halogenated polysilanes as pure compound or mixture of compounds which each have at least one direct Si—Si bond and substituents of which consist of halogen or of halogen and in a composition of which the atomic ratio for substituent:silicon is at least 1:1, wherein the polysilane consists of rings and chains having a high amount of branching points which is >1% based on an entire product mixture, has a Raman molecular vibration spectrum of $I_{100}/I_{132} <1$, where $I_{100}$ is a Raman intensity at 100 cm$^{-1}$ and $I_{132}$ is a Raman intensity at 132 cm$^{-1}$, and its significant product signals in $^{29}$Si NMR spectra are in a chemical shift range of +23 ppm to −13 ppm, −18 ppm to −33 ppm and −73 ppm to −93 ppm.

2. The method according to claim 1, wherein the long-chain halogenated polysilanes are halogenated polysilanes as pure compound or mixture of compounds which each have at least one direct Si—Si bond and substituents of which consist of halogen or of halogen and hydrogen and in a composition of which an atomic ratio for substituent:silicon is at least 1:1, wherein
   a. the halogen is selected from the group consisting of chlorine, bromine, fluorine and iodine and combinations thereof,
   b. its significant product signals in $^{29}$Si NMR spectra are in a chemical shift range of +15 ppm to −7 ppm when the halogen is chlorine; its significant product signals in $^{29}$Si NMR spectra are in a chemical shift range of −10 ppm to −42 ppm, −48 ppm to −52 ppm and/or −65 ppm to −96 ppm when the halogen is bromine; its significant product signals in $^{29}$Si NMR spectra are in a chemical shift range of 8 ppm to −30 ppm and/or −45 ppm to −115 ppm when the halogen is fluorine; and its significant product signals in $^{29}$Si NMR spectra are in a chemical shift range of −20 ppm to −55 ppm, −65 ppm to −105 ppm and/or −135 ppm to −181 ppm when the halogen is iodine.

3. The method according to claim 2, wherein the halogen is chlorine and the halogenated polysilanes additionally have a Raman molecular vibration spectrum of $I_{100}/I_{132}$ larger than 1, where $I_{100}$ is a Raman intensity at 100 cm$^{-1}$ and $I_{132}$ is a Raman intensity at 132 cm$^{-1}$, and wherein hydrogen content of the polysilanes is less than 2 atomic %, and the polysilane contains substantially no short-chain branched chains and rings, wherein a level of branching points in the summed fraction of perhalogenated derivatives of neohexasilane, neopentasilane, isotetrasilane, isopentasilane, perchloro-2,3-disilyltetrasilane and isohexasilane, is less than 1 mol% based on an entire product mixture.

4. The method according to claim 1, wherein some of the short-chain chlorinated polysilanes is refluxed in the reactor.

5. The method according to claim 1, wherein the low-molecular halosilanes are halogenated polysilanes.

6. The method according to claim 1, wherein short-chain low-molecular halosilanes have formula $Si_nX_{2n+2}$, where n=1-4.

7. The method according to claim 1, wherein the short-chain chlorinated polysilanes comprise low-molecular chlorosilanes.

8. The method according to claim 1, wherein the low-molecular halosilanes are liquid halogenated silanes of low viscosity.

9. The method according to claim 1, conducted at temperatures above 200° C. and below a melting point of elemental silicon.

10. The method according to claim 1, conducted without a protective gas stream.

11. The method according to claim 1, conducted continuously.

12. The method according to claim 1, wherein the thermolytic decomposition is in an undiluted halosilane atmosphere.

13. The method according to claim 1, wherein the thermolytic decomposition is in a halosilane stream of diluents and reaction products.

14. The method according to claim 1, wherein the low-molecular halosilanes serve as source of the halosilane atmosphere.

15. A method of producing short-chain halogenated polysilanes and/or short-chain halogenated polysilanes and halide-containing silicon comprising thermolytically decomposing long-chain halogenated polysilanes, wherein the thermolytic decomposition of long-chain halogenated polysilanes undiluted or diluted with low-molecular halosilanes is in a halosilane atmosphere, wherein more than 0.1% by weight of a total amount of chloride-containing silicon disperses in dust form in a gas phase.

16. The method according to claim 15, wherein some of the dust-form chloride-containing silicon is washed back into a reactor by condensing and/or refluxing short-chain chlorinated polysilanes.

17. A method of producing short-chain halogenated polysilanes and/or short-chain halogenated polysilanes and halide-containing silicon comprising thermolytically decomposing long-chain halogenated polysilanes, conducted at a pressure of 10 hPa to 500 hPa, wherein the thermolytic decomposition of long-chain halogenated polysilanes undiluted or diluted with low-molecular halosilanes is in a halosilane atmosphere.

18. The method according to claim 17, wherein hydrogen is added as a reducing gas.

* * * * *